US011663102B2

(12) United States Patent
Sethi et al.

(10) Patent No.: US 11,663,102 B2
(45) Date of Patent: May 30, 2023

(54) EVENT-BASED OPERATIONAL DATA COLLECTION FOR IMPACTED COMPONENTS

(71) Applicant: Dell Products L.P., Round Rock, TX (US)

(72) Inventors: Parminder Singh Sethi, Ludhiana (IN); Anannya Roy Chowdhury, Jamshedpur (IN)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 17/150,662

(22) Filed: Jan. 15, 2021

(65) Prior Publication Data

US 2022/0229753 A1 Jul. 21, 2022

(51) Int. Cl.
| | |
|---|---|
| *G06F 11/30* | (2006.01) |
| *G06N 20/00* | (2019.01) |
| *G06F 11/07* | (2006.01) |
| *G06F 11/32* | (2006.01) |
| *G06F 11/00* | (2006.01) |
| *G06F 18/2413* | (2023.01) |
| *G06F 11/34* | (2006.01) |

(52) U.S. Cl.
CPC ........ *G06F 11/3006* (2013.01); *G06F 11/008* (2013.01); *G06F 11/0772* (2013.01); *G06F 11/3075* (2013.01); *G06F 11/327* (2013.01); *G06F 11/3447* (2013.01); *G06F 18/24147* (2023.01); *G06N 20/00* (2019.01); *G06F 11/079* (2013.01)

(58) Field of Classification Search
CPC ............ G06F 11/3006; G06F 11/3057; G06F 11/079; G06F 11/3075; G06F 11/008; G06F 11/3447; G06N 20/00
See application file for complete search history.

(56) References Cited

U.S. PATENT DOCUMENTS

| | | | |
|---|---|---|---|
| 2021/0248024 A1* | 8/2021 | Poola | G06F 16/217 |
| 2022/0027257 A1* | 1/2022 | Harutyunyan | G06F 11/0709 |

OTHER PUBLICATIONS

Dell EMC, "Dell EMC SupportAssist Enterprise 2.x—Guide and Download," Article No. 179530, https://www.dell.com/support/kbdoc/en-us/000179530/dell-emc-supportassist-enterprise-2-x-guide-and-download, Dec. 5, 2020, 7 pages.
M. Rouse, "MTBF (mean time between failures)" https://whatis.techtarget.com/definition/MTBF-mean-time-between-failures#:~:text=MTBF%20(mean%20time%20between%20failures)%20is%20a%20measure%20of%20how,between%20f, Mar. 2011, 2 pages.

* cited by examiner

*Primary Examiner* — Yolanda L Wilson
(74) *Attorney, Agent, or Firm* — Ryan, Mason & Lewis, LLP

(57) ABSTRACT

A method comprises receiving a notification of an issue with at least one component of a plurality of components in a computing environment. One or more machine learning algorithms are used to determine one or more components of the plurality of components impacted by the issue with the at least one component. The method further comprises collecting operational data for the at least one component and the one or more impacted components.

20 Claims, 10 Drawing Sheets

| Parameters | Description | Use |
|---|---|---|
| Heat Resistance | Heat Bearing capacity of Device/Components | Calculate Heat Resistance capacity |
| Mean Time Between Failure | MTBF for devices and their components | MTBF required to estimate the time before which a component needs replacement |
| Date of Manufacture | Date of Manufacture of Component /Device | Calculate date of Failure / breakdown |
| Coordinates of Components | Components map placed in the device | Calculate proximal distance from affected components |

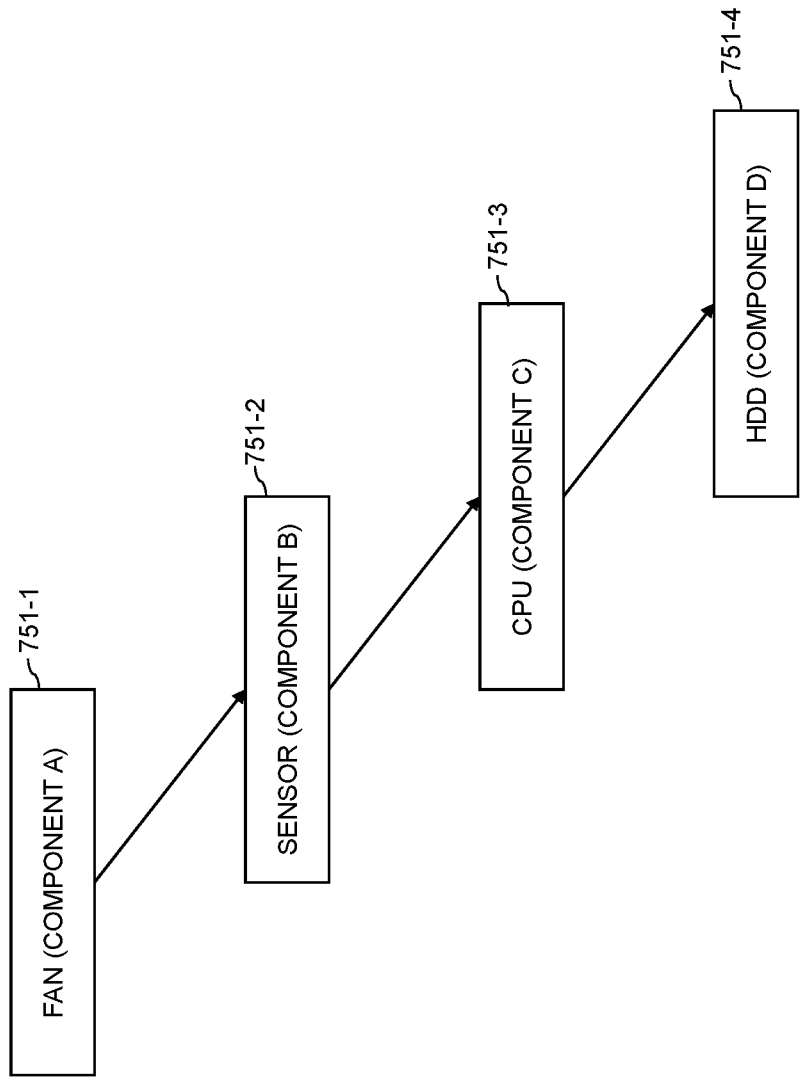

EVENT-BASED OPERATIONAL DATA COLLECTION FOR IMPACTED COMPONENTS

FIELD

The field relates generally to information processing systems, and more particularly to operational data collection from components impacted by events.

BACKGROUND

In a data center environment, there can be thousands of devices (e.g., servers, storage devices, switches, etc.) located in different racks and decks. Different devices may have a stack of components within them. When components within devices fail, it is important to compile and store device operational details corresponding to the circumstances surrounding the failures so that such information can be used by technical support personnel when determining why issues arose and to accurately pinpoint component states at or prior to the failures.

Under current approaches, there is a lapse of time between a failure event and the collection of operational data for multiple components of a device. As a result, there may be several changes in the states of such components before their data is collected. This leads to discrepancies and inaccuracies when attempting to determine root causes of operational failures.

SUMMARY

Illustrative embodiments provide techniques to use machine learning to determine components impacted by a failure event and to collect operational data for the impacted components.

In one embodiment, a method comprises receiving a notification of an issue with at least one component of a plurality of components in a computing environment. One or more machine learning algorithms are used to determine one or more components of the plurality of components impacted by the issue with the at least one component. The method further comprises collecting operational data for the at least one component and the one or more impacted components.

These and other illustrative embodiments include, without limitation, methods, apparatus, networks, systems and processor-readable storage media.

BRIEF DESCRIPTION OF THE DRAWINGS

FIG. 6 depicts a table including example parameters used in connection with determining impacted components according to an illustrative embodiment.

FIG. 7 depicts an impact tree of impacted components according to an illustrative embodiment.

DETAILED DESCRIPTION

Figure 1:
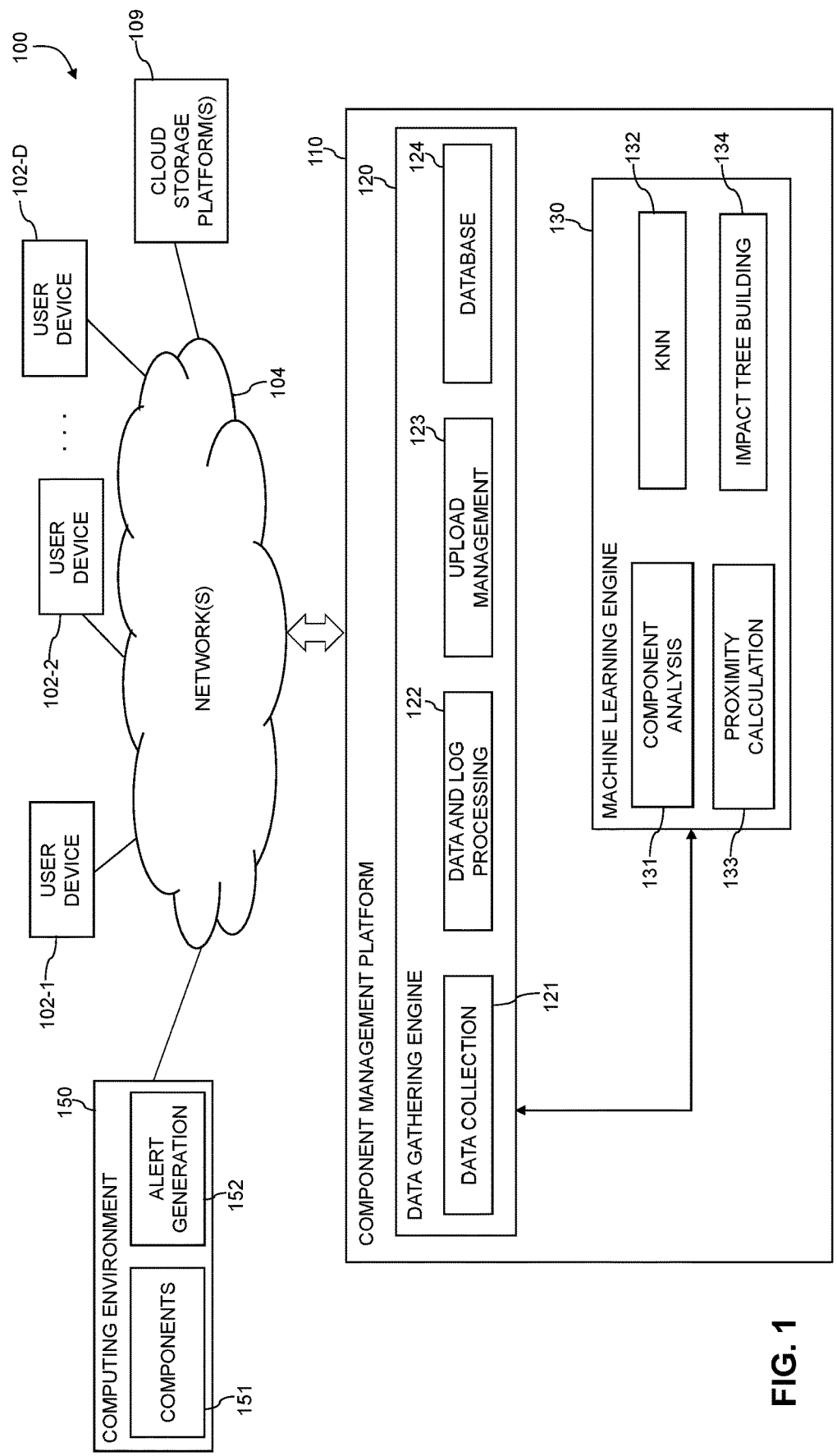
FIG. 1 depicts details of an information processing system with a component management platform for automatically determining components impacted by a failure event and collecting operational data for the impacted components according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "component" is to be broadly construed, and can refer to various parts, hardware components and/or software components such as, but not necessarily limited to, storage devices (e.g., hard disk drives), batteries, chassis, display panels, motherboards, central processing units (CPUs), controllers, cards, heat sinks, fans, fan assemblies, processors, ports, port connectors, host bus adaptors (HBAs), speakers, keyboards, memories, servers, switches, sensors, buses (e.g., serial buses), networks or other elements of a computing environment that may fail or malfunction.

Illustrative embodiments provide techniques to use machine learning to generate and collect alert-based logs and operational data for a component which has an issue and to further collect and generate logs and operational data for other components identified to be impacted by the component with the issue. The embodiments provide an event-based triggering system to record the statuses and other operational data of impacted components at the time of an alert for and/or failure of a given component. The recorded statuses and operational data are used to identify if there are any functional issues with the affected components.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a component management platform 110.

The user devices 102 can comprise, for example, Internet of Things (IoT) devices, desktop, laptop or tablet computers, mobile telephones, or other types of processing devices capable of communicating with the component management platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, N and P are assumed to be arbitrary positive integers greater than or equal to two.

The terms "client", "customer" or "user" herein are intended to be broadly construed so as to encompass numerous arrangements of human, hardware, software or firmware entities, as well as combinations of such entities. Component data management services may be provided for users utilizing one or more machine learning models, although it is to be appreciated that other types of infrastructure arrangements could be used. At least a portion of the available services and functionalities provided by the component management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the component management platform 110, as well as to support communication between the component management platform 110 and connected devices (e.g., user devices 102) and/or other related systems and devices not explicitly shown.

Users may refer to customers, clients and/or administrators of computing environments for which component failures are being analyzed and addressed. For example, in some embodiments, the user devices 102 are assumed to be associated with repair technicians, system administrators, information technology (IT) managers, software developers release management personnel or other authorized personnel configured to access and utilize the component management platform 110.

The information processing system 100 further includes one or more computing environments 150 connected to the user devices 102 and to the component management platform 110 via the network 104. The computing environment 150 comprises components 151 such as, for example, storage devices (e.g., hard disk drives (HDDs)), batteries, chassis, display panels, motherboards, central CPUs, controllers, cards, heat sinks, fans, fan assemblies, processors, ports, port connectors, HBAs, speakers, keyboards, memories, servers, switches, sensors and buses (e.g., serial buses), which are connected over one or more networks like network 104 and/or through direct wired connections. A non-limiting example of a computing environment 150 is a data center. However, a computing environment may be any type of architecture comprising multiple components and devices, which may be connected to each other over one or more networks and/or through direct wired connections.

One or more cloud storage platforms 109 are connected to the network 104 and may be accessed by the user devices 102, computing environments 150 and/or component management platform 110. The cloud storage platform 109 includes, for example, a commercially available cloud storage infrastructure.

The component management platform 110 manages different devices in the computing environment 150, and supports the generation and collection of logs and operational data as, for example, snapshots of the states of components within the devices. When one or more components 151 in the computing environment 150 fail and/or encounter a problem or issue with their operation, the alert generation layer 152 generates an alert about the failure and/or issue, which is received by the component management platform 110 as a notification. The notification may include details about the component that failed and/or had an issue with its operation. Such details may comprise, for example, identifiers (e.g., world-wide names (WWNs), world-wide port names (WWPNs) world-wide node names (WWNNs)), location codes, serial numbers, logical partition (LPAR) and virtual machine (VM) identifiers and/or names and Internet Protocol (IP) addresses and/or names.

Responsive to an alert about a failure event and/or operational issue with a component or upon detection by the component management platform 110 of such a failure event and/or operational issue, the component management platform 110 performs operational data collection, the operational data including, for example, details about component states and component operational logs. Such operational data provides evidence of the component and/or device states surrounding the generation of an alert and/or failure event, and assist with identifying causes of the operational issues and/or the health of the components at that time. The collected operational data may further include performance metrics such as, but not necessarily limited to, throughput, latency, memory capacity and usage, response and completion time, channel capacity and bandwidth which may be collected via sensors or other equipment or software associated with the component management platform 110.

For example, when a component 151 within a device, for example, a fan, encounters an issue, an alert generation layer 152 generates an alert that is received by the component management platform 110, which collects and uploads to, for example, cloud storage platform 109, operational data comprising operational details of the component and of other components impacted by the fan issue. As explained further herein, the component management platform 110 uses machine learning techniques to determine the other components impacted by a given component's operational issues and/or failures so that operational data for these other components can be collected in a timely matter to determine the states of all affected components at the time of an event.

Events and/or issues which may require operational data collection include, but are not necessarily limited to, component malfunctions or interoperability, scan failures, read failures, write failures, memory failures, high component temperatures (e.g., exceeding a given temperature threshold), high levels of paging activity (e.g., exceeding a given activity threshold), crashes of the components (e.g., kernel and hard drive crashes), booting issues and address changes (e.g., media access control address (MAC address) changes). Some example alert notifications may specify, for example, component malfunctions or interoperability, scan failures, high hard disk temperature detected, high paging activity detected, kernel crash detected and local area network (LAN) adapter MAC change detected. As noted above, the alert notifications further specify the component having the issue such as, for example, a fan, HDD, CPU, port, bus, motherboard, memory, heat sink, sensor, wide local area network (WLAN), etc.

The component management platform 110 in the present embodiment is assumed to be accessible to the user devices 102, and vice-versa, over the network 104. In addition, the component management platform 110 and the user devices 102 can access the computing environment 150 and the cloud storage platform 109 over the network 104. The network 104 is assumed to comprise a portion of a global computer network such as the Internet, although other types of networks can be part of the network 104, including a wide area network (WAN), a LAN, a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The component management platform 110, on behalf of respective infrastructure tenants each corresponding to one or more users associated with respective ones of the user devices 102 provides a platform for automatically determining components impacted by a failure event and collecting operational data for the impacted components.

Referring to FIG. 1, the component management platform 110 comprises a data gathering engine 120 and a machine learning engine 130. The data gathering engine 120 includes a data collection layer 121, a data and log processing layer 122, an upload management layer 123 and a database 124. The machine learning engine 130 includes a component analysis layer 131, a k-Nearest Neighbor (KNN) layer 132, a proximity calculation layer 133 and an impact tree building layer 134.

Referring to the system 100 in FIG. 1, according to one or more embodiments, the data collection layer 121 of the data gathering engine 120 collects operational data (as described herein above) of components 151 from the computing environment 150. The collected data may be stored in one or more databases 124. In an embodiment, the data collection layer 121 is integrated with the computing environment 150. The data collection layer 121 may have access to the computing environment 150 using one or more application programming interface protocols such as, for example, Redfish® representational state transfer (REST) protocol.

Figure 2:
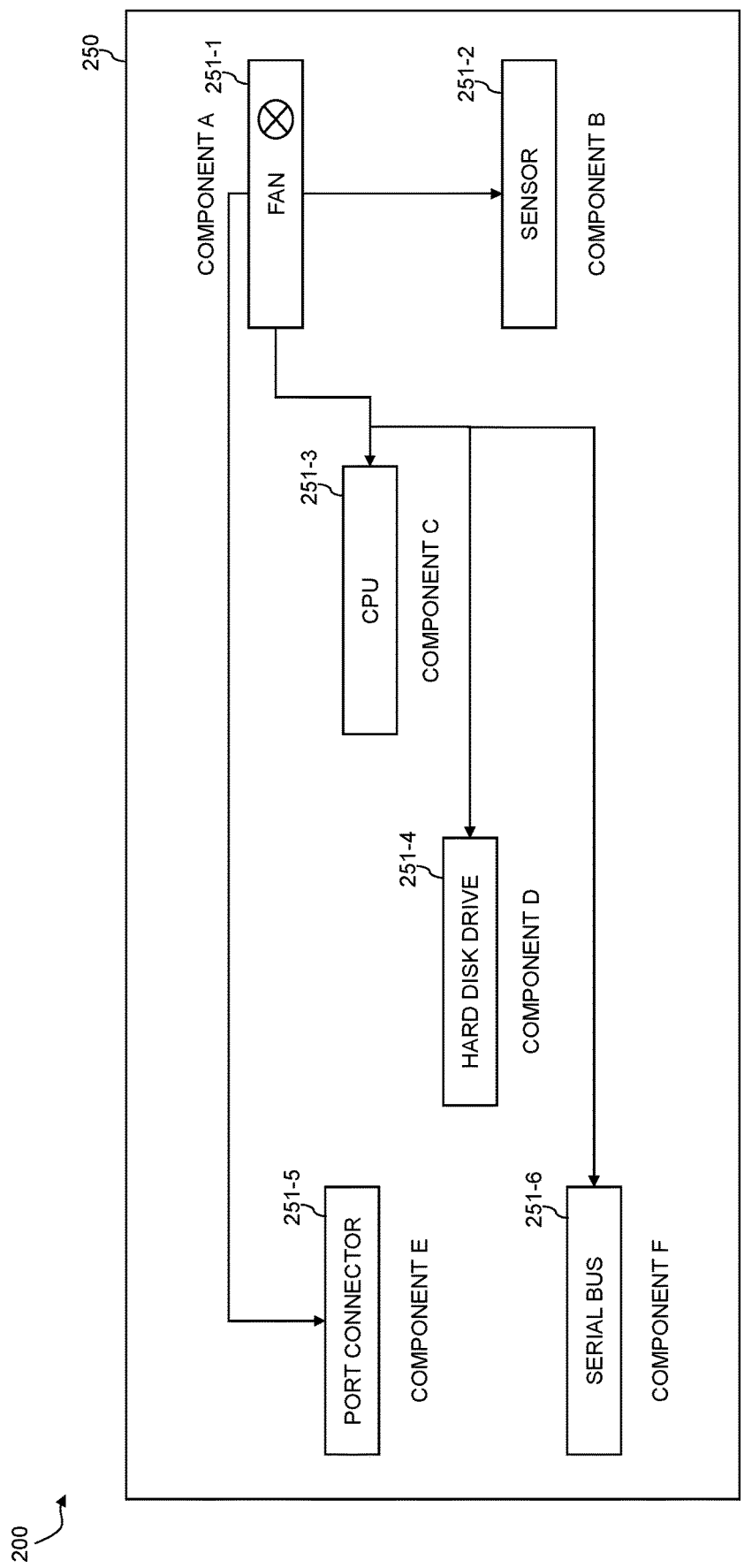
FIG. 2 depicts device component links according to an illustrative embodiment.

Upon receipt of a notification (e.g., alert) of an issue with a component 151 in the computing environment 150, the component management platform 110, more particularly, the machine learning engine 130, determines whether any other components 151 in addition to the root component having the issue are impacted by the issue with the root component. In a non-limiting operational example, referring to the linkage diagram 200 in FIG. 2, in a computing environment 250, an alert is generated from a fan 251-1 (component A), where an "X" symbol indicates a problem with the fan 251-1. The fan 251-1 is proximately linked to a sensor 251-2 (component B) and a CPU 251-3 (component C), and further linked to HDD 251-4 (component D), port connector 251-5 (component E) and serial bus 251-6 (component F). The component analysis layer 131 identifies those components in the computing environment (e.g., 150 and/or 250) impacted by the issue with the root component (e.g., fan 251-1). The component analysis layer 131 utilizes KNN and proximity calculation layers 132 and 133 to determine an impact hierarchy of the impacted components. The impact hierarchy arranges the impacted components in a descending order of impact by the issue with the root component. An impact tree building layer 134 generates impact trees corresponding to determined impact hierarchies. For example, in connection with the operational example of a fan 251-1 and linked components 251-2 to 251-6, based on analysis performed by the KNN and proximity calculation layers 132 and 133, the component analysis layer 131 determines an impact hierarchy with the sensor 251-2 (component B) experiencing the most impact by the issue with the fan 25-1, then the CPU 251-3 (component C) experiencing the next highest impact, followed by the HDD 251-4 (component D), port connector 251-5 (component E) and serial bus 251-6 (component F). Referring to FIG. 7, the impact tree building layer 134 generates, for example, an impact tree 700 comprising a fan 751-1 as the root component having the issue (component A), linked to sensor 751-2, which the most impacted component (component B), which is linked to the CPU 751-3 (component C), which is impacted less than the sensor 751-2, and then HDD 751-4 (component D), which is linked to and impacted less than the CPU 751-3. The order followed for building an impact tree is from a first viable affected component to a last and most resistant affected component.

The impact order of affected components is determined based on a plurality of parameters including, but not necessarily limited to, a computed physical distance of a component from the root component, a predicted failure date of an affected component, a calculated mean time between failure of an affected component, and/or a computed heat resistance value of an affected component. Referring to the table 600 in FIG. 6, some example parameters of heat resistance, mean time between failure (MTBF), date of manufacture and coordinates of components are listed along with their respective descriptions and use in connection with determining how much that component is impacted by a failure of another component. For example, the heat resistance of a given component is used to determine the heat bearing capacity of that component and/or its corresponding device, and is used to calculate a heat resistance capacity of that component and/or its corresponding device. Such values may be relevant when a component that controls temperature and/or reduces heat malfunctions or fails. The MTBF for a given component provides an indication of the reliability of a component by determining a time before a component will fail (e.g., number of hours a component can be used before it fails). MTBF values can be determined by the component analysis layer 131 based on training data about testing, actual use and manufacturer data associated with given components. Components with a lower MTBF may be, for example, ranked higher in an impact hierarchy as such components are closer to the end of their useful life. Similarly, the date of manufacture of a given component provides information on the age of a component, and when that component may fail. The component analysis layer 131 may use the date of manufacture by itself or in connection with the MTBF to determine whether the component is closer to failure than other components, and may need to be ranked higher in an impact order based on its failure probability. The component coordinates provide information on the physical location of a component with respect to a root component, such that components physically closer to the root component may be determined to be more impacted by failure of the root component than components farther away from the root component. Using, for example, a component map of a device comprising component coordinates, the proximity calculation layer 133 calculates the physical distance of components from a root component as a factor for determining impact hierarchy.

In keeping with the operational example of the fan 251-1 as the root component, the sensor 251-2 is the first affected component. In this case, using layout data and/or location codes and identifiers for devices and their components received from the computing environment 150/250, the proximity calculation layer 133 determines the physical locations of the components (e.g., 251-2 to 251-6) with respect to the root component (e.g., 251-1). In the working example, the sensor 251-2, CPU 251-3 and the HDD 251-4 are determined to be in relatively close physical proximity to the fan 251-1, with the sensor 251-2 being closest, and the CPU 251-3 being closer than the HDD 251-4. Based on, for example, training data regarding how different components operate and interact with each other, the component analysis layer 131 further analyzes how the inability of one component to fail to operate affects other components. For example, in the case of the fan 251-1 not being to operate, the component analysis layer 131 may conclude that the sensor 251-2 is the most likely component to be initially affected by the dysfunctionality of the fan 251-1 because the increase in heat will impact the sensor 251-2 first. Then, the operation of the CPU 251-3 may be determined to get affected after the sensor 251-2 due to the proximity of the CPU 251-3 to the fan 251-1 and the need for avoidance of high temperatures in the CPU 251-3.

According to one or more embodiments, the KNN layer 132 is used to identify the components that are dependent or not dependent on the root component for which a notification (e.g., alert) has been generated. The KNN algorithm analyzes the plurality of parameters described herein (e.g., computed physical distance of a component from the root component, a predicted failure date of an affected component, a calculated mean time between failure of an affected component, and/or a computed heat resistance value of an affected component) to find the k-nearest components to the root component, and/or the k number of components most similar to the root component. The KNN layer 132 outputs the components that occur most frequently (e.g., modes) as being nearest to the root component and/or most similar to the root component for each of the different parameters or different groups of two or more parameters. For example, the sensor 251-2 may be most frequently considered nearest to the root component and/or most similar to the root component for the plurality of parameters when taken individually or in groups, so that it is deemed the most impacted of all of the considered components. Similarly, the CPU 251-3 may be the next most frequently appearing component as nearest to the root component and/or most similar to the root component for the plurality of parameters or groups of parameters. According to one or more embodiments, the value of k can be user-specified, and the similarity or distance between components is calculated using, for example, Hamming distance.

Figure 3:
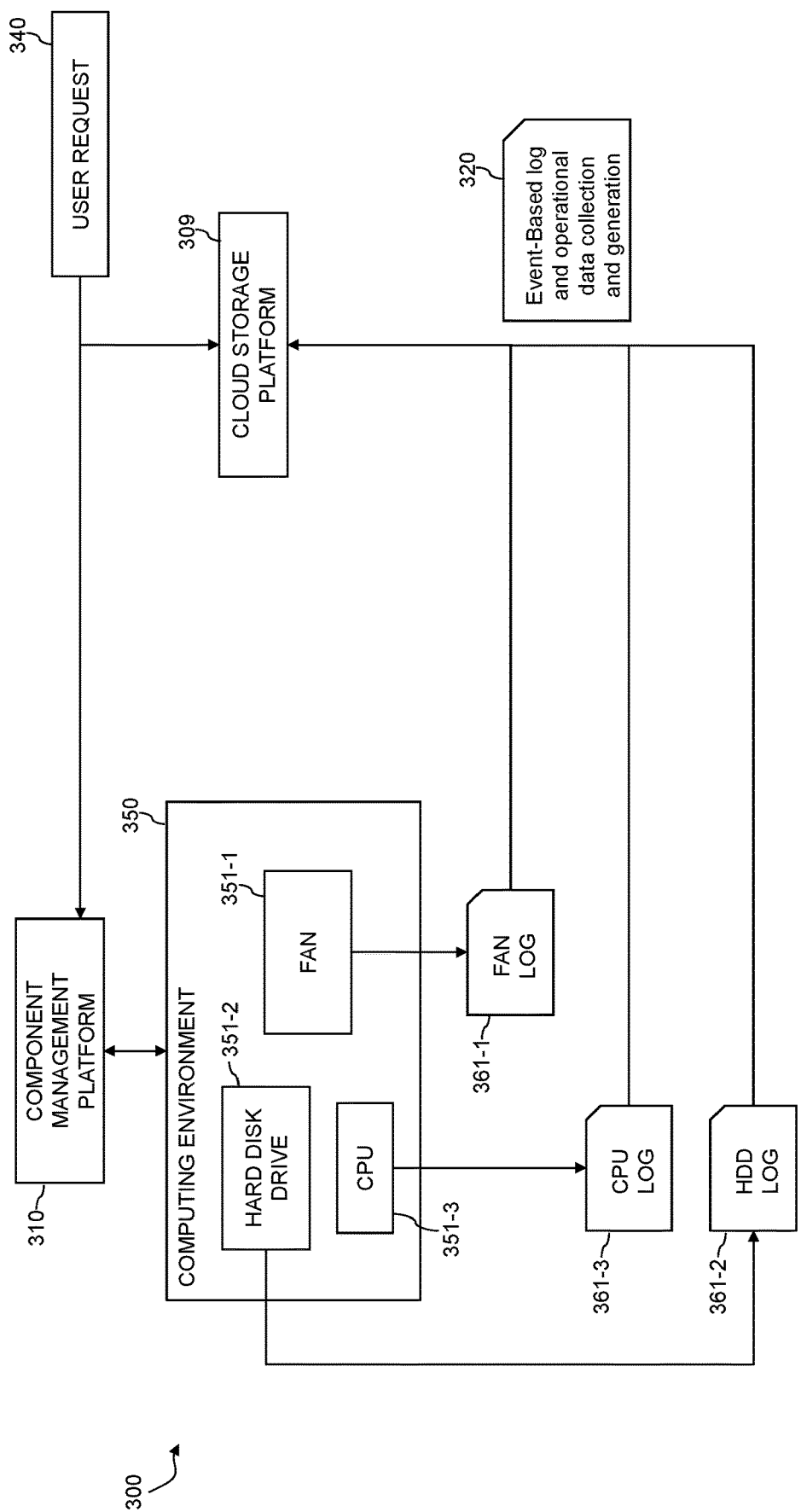
FIG. 3 depicts details of an operational flow for the collection of operational data for impacted components according to an illustrative embodiment.

Based on the determined impact order and the impact tree generated by the impact tree building layer 134, the data collection layer 121 collects the operational data starting from the root component and from the one or more impacted components in an order corresponding to the impact hierarchy. Referring to the operational flow 300 in FIG. 3, the collection of operational data occurs in an ordered fashion based on the impact ranking of the components. Referring back to FIG. 1, the collected operational data is processed by a data and log processing layer 122 and stored in a local database 124. In an illustrative embodiment, data and log processing layer 122 filters the collected data and tags and/or classifies the data into different categories. For example, the data and log processing layer 122 categorizes and filters operating conditions data based on characteristics such as, but not necessarily limited to, types of performance metrics, alerts and/or events. The data and log processing layer 122 filters the data in such a way that the required information from big un-structured and structured data sets is collected from the computing environment 150 and sorted for further analysis. An upload management layer 123 controls uploading of the operational data to a cloud storage platform 109 or 309.

According to illustrative embodiments, the determination of the components impacted by the issue with the root component, and the collection of operational data from the impacted components is performed as a real-time response to the receipt by the component management platform of the notification of the issue with the root component. For example, referring to FIG. 3, once the component management platform 310 receives a notification (e.g., alert) of an issue with the fan 351-1 of computing environment 350, the component management platform 310, which is the same or similar to the component management platform 110, using a machine learning engine applying the machine learning techniques discussed herein, determines that a hard disk drive (HDD) 351-2 and a CPU 351-3 are impacted by the issue with the fan 351-1, and collects operational data logs including a fan log 361-1, an HDD log 361-2 and a CPU log 361-3 from the impacted components 351-1, 351-2 and 351-3 as a real-time response to the notification of the issue with the fan 351-1. For example, event-based (e.g., failure event-based) log and operational data collection and generation 320 is performed by a data gathering engine (e.g., data gathering engine 120), which manages processing and uploading of the collected log and operational data to a cloud storage platform 309. A user, such as an engineer or technical personnel, can send a request via, for example, one of the user devices 102 to the cloud storage platform 309 for the uploaded operational data to use when troubleshooting and/or determining causes and consequences of a failure event. A user may also send queries for additional logs of impacted components to the component management platform 310.

Figure 4:
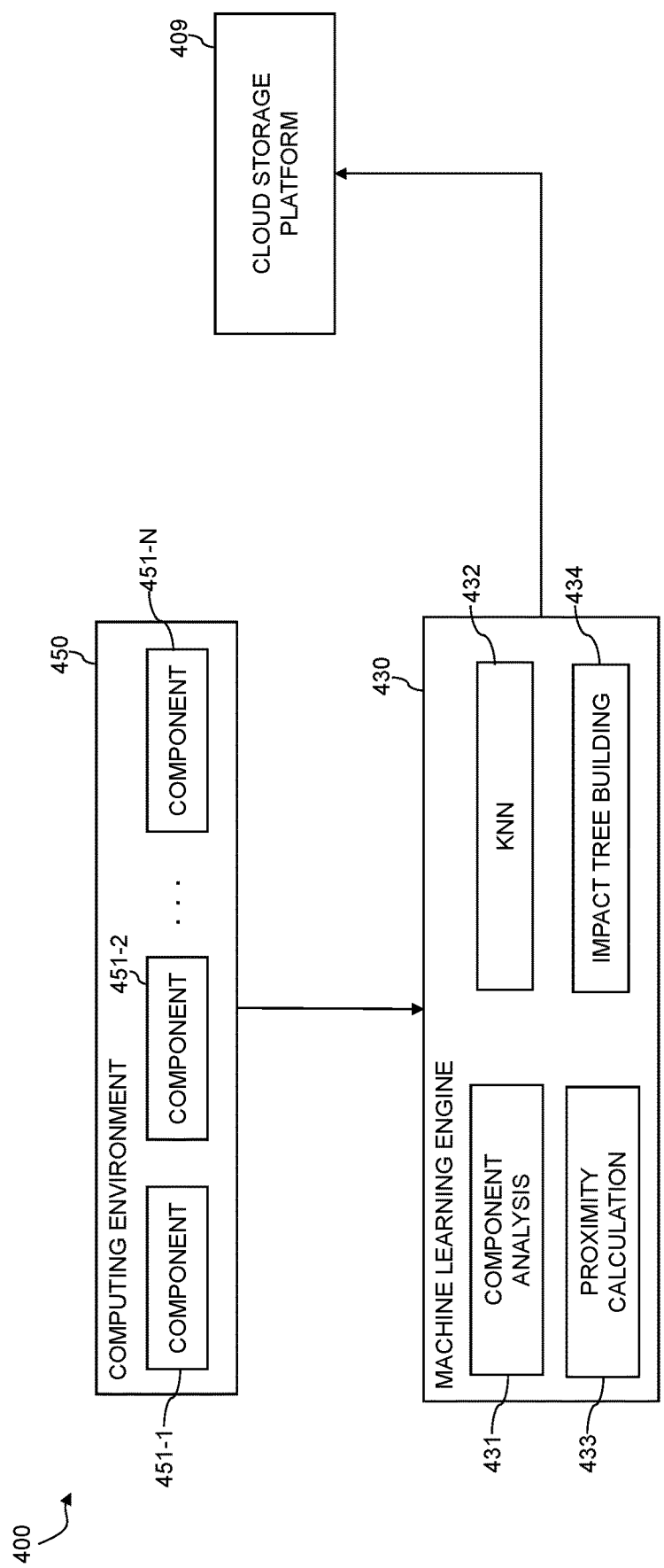
FIG. 4 depicts details of an operational flow for the determination of components impacted by a failure event and the collection of operational data for the impacted components according to an illustrative embodiment.

FIG. 4 depicts details of an operational flow 400 for the collection of operational data for impacted components. Similar to the computing environments 150, 250 and 350, the computing environment includes 450 includes a plurality of components 451-1, 451-2, . . . , 451-N (collectively "components 451"). Upon failure or an issue with one of the components 451, the machine learning engine 430 including component analysis, KNN, proximity calculation and impact tree building layers 431, 432, 433 and 434 (the same or similar to the component analysis, KNN, proximity calculation and impact tree building layers 131, 132, 133 and 134 discussed in connection with FIG. 1) analyzes various component parameters using one or more machine learning techniques to determine an impact hierarchy of impacted components 451 from the failure of one of the components 451.

For example, in determining the impacted components and the impact hierarchy, the machine learning engine 430 computes physical distances of respective ones of the components 451 from the component that had the failure or issue, predicts failure dates of respective ones of the components 451 based at least in part on their manufacture dates, computes mean times between failure of respective ones of the components 451 and/or calculates heat resistance values of respective ones of the components 451, and determines whether the respective ones of the components 451 are impacted by the issue with the root component based on one or more of the computed physical distances, predicted failure dates, computed mean times between failure and calculated heat resistance values. Such parameters may be analyzed by the machine learning engine 430 using a KNN algorithm.

Based on the determined impact hierarchy, the operational data is collected starting from the root component and from the impacted components in an order corresponding to the impact hierarchy, and uploaded to the cloud storage platform 409. The operational data comprises operational details such as, for example, states and operational logs of the root and impacted components. As noted herein, the collection of the operational data for the root component and the impacted components is performed in real-time (e.g., at a time of generation of an alert or immediately thereafter) to avoid any lapses of time from the failure event where the state of impacted components may change if data collection is delayed.

Figure 5:
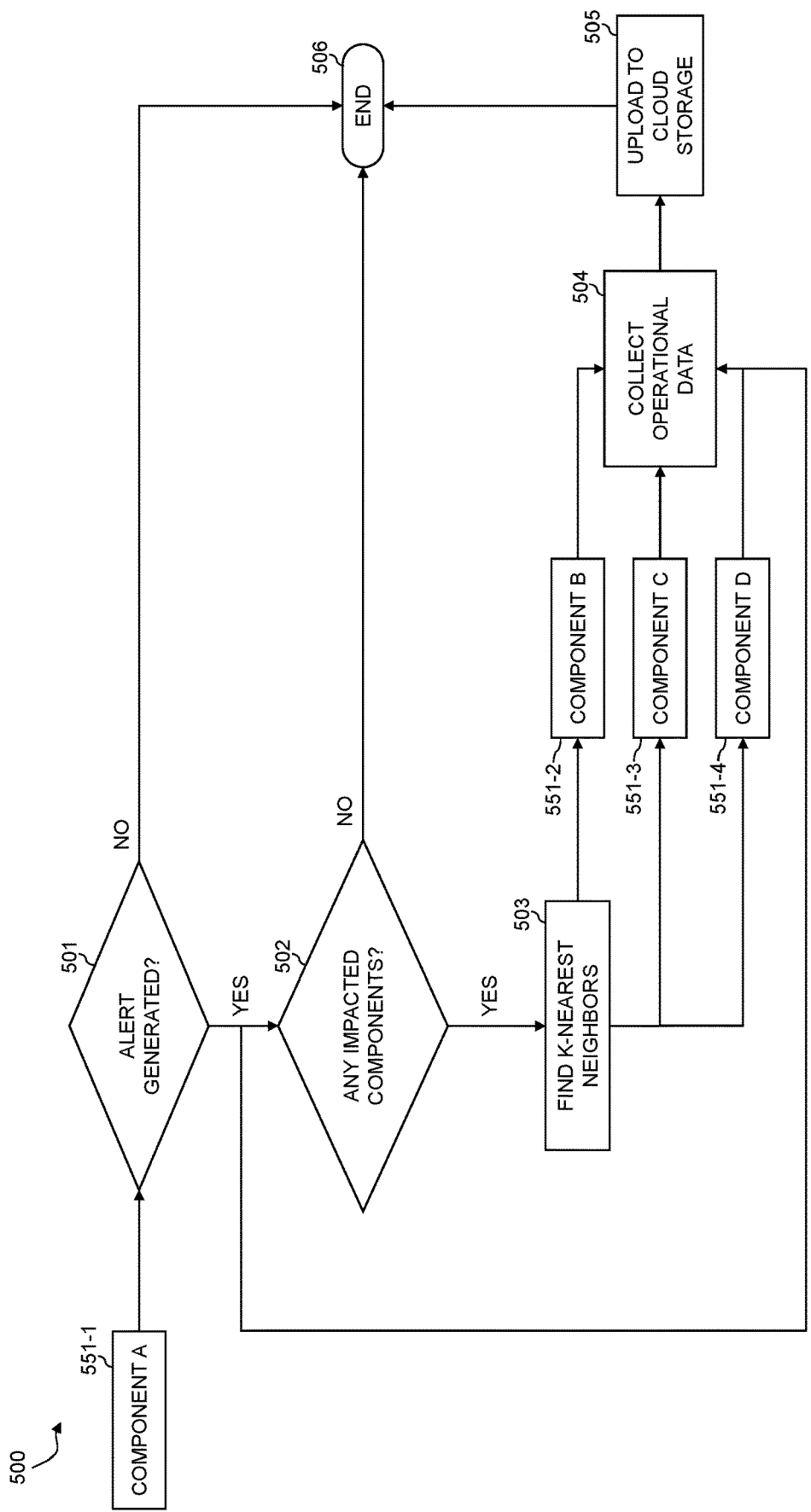
FIG. 5 depicts a process for the determination of components impacted by a failure event and the collection of operational data for the impacted components according to an illustrative embodiment.

Referring to the process 500 in FIG. 5, if an alert is generated (block 501) in connection with a failure or issue with component A 551-1, a machine learning engine including a KNN layer determines whether there are any impacted components (block 502) due to the failure or issue with component A 551-1. For example, the machine learning engine classifies dependent/non-dependent components with respect to a component (e.g., component A 551-1) that is the subject of an alert. If yes at block 502, the KNN layer finds the k-nearest neighbors to generate the impact hierarchy and an impact tree. For example, an impact hierarchy and impact tree may comprise components B, C and D 551-2, 551-3 and 551-4, with component A 551-1 as the root component. Based on the impact hierarchy, a data gathering engine collects the operational data for the root and impacted components (block 504). The collected operational data is uploaded to cloud storage (block 505) and the process 500 ends at block 506. It there is no alert at block 501 or no impacted components are identified at block 502, the process 500 ends at block 506. In addition, if there is an alert generated at block 501, as shown by the connection extending from between blocks 501 and 502 to block 504, the operational data is collected for component A 551-1.

According to one or more embodiments, the database 124 and cloud storage platforms 109, 309 and 409 used herein can be configured according to a relational database management system (RDBMS) (e.g., PostgreSQL). Databases and/or storage platforms in some embodiments are implemented using one or more storage systems or devices associated with the component management platform 110. In some embodiments, one or more of the storage systems utilized to implement the databases and/or storage platforms comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the component management platform 110, the data gathering engine 120 and the machine learning engine 130 in other embodiments can be implemented at least in part externally to the component management platform 110, for example, as stand-alone servers, sets of servers or other types of systems coupled to the network 104. For example, the data gathering engine 120 and the machine learning engine 130 may be provided as cloud services accessible by the component management platform 110.

The data gathering engine 120 and the machine learning engine 130 in the FIG. 1 embodiment are each assumed to be implemented using at least one processing device. Each such processing device generally comprises at least one processor and an associated memory, and implements one or more functional modules for controlling certain features of the data gathering engine 120 and/or the machine learning engine 130.

At least portions of the component management platform 110 and the components thereof may be implemented at least in part in the form of software that is stored in memory and executed by a processor. The component management platform 110 and the components thereof comprise further hardware and software required for running the component management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data gathering engine 120, the machine learning engine 130 and other components of the component management platform 110 in the present embodiment are shown as part of the component management platform 110, at least a portion of the data gathering engine 120, the machine learning engine 130 and other components of the component management platform 110 in other embodiments may be implemented on one or more other processing platforms that are accessible to the component management platform 110 over one or more networks. Such components can each be implemented at least in part within another system element or at least in part utilizing one or more stand-alone components coupled to the network 104.

It is assumed that the component management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data gathering engine 120, the machine learning engine 130 and other components of the component management platform 110, and the elements thereof can each be implemented in the form of one or more LXCs running on one or more VMs. Other arrangements of one or more processing devices of a processing platform can be used to implement the data gathering engine 120 and the machine learning engine 130 as well as other components of the component management platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the component management platform 110 to reside in different data centers. Numerous other distributed implementations of the component management platform 110 are possible.

Accordingly, one or each of the data gathering engine 120, the machine learning engine 130 and other components of the component management platform 110 can each be implemented in a distributed manner so as to comprise a plurality of distributed components implemented on respective ones of a plurality of compute nodes of the component management platform 110.

It is to be appreciated that these and other features of illustrative embodiments are presented by way of example only, and should not be construed as limiting in any way.

Accordingly, different numbers, types and arrangements of system components such as the data gathering engine 120, the machine learning engine 130 and other components of the component management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the component management platform can be offered to cloud infrastructure customers or other users as part of FaaS, CaaS and/or PaaS offerings.

Figure 8:
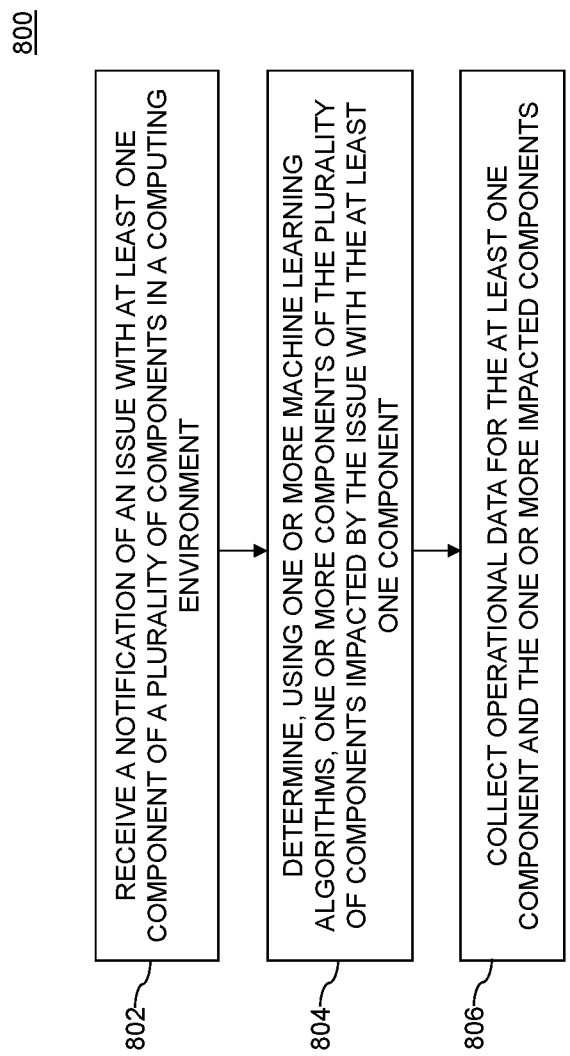
FIG. 8 depicts a process for automatically determining components impacted by a failure event and collecting operational data for the impacted components according to an illustrative embodiment.

The operation of the information processing system 100 will now be described in further detail with reference to the flow diagram of FIG. 8. With reference to FIG. 8, a process 800 for automatically determining components impacted by a failure event and collecting operational data for the impacted components as shown includes steps 802 through 806, and is suitable for use in the system 100 but is more generally applicable to other types of information processing systems comprising a component management platform configured for automatically determining components impacted by a failure event and collecting operational data for the impacted components.

In step 802, a notification of an issue with at least one component of a plurality of components in a computing environment is received, and in step 804, using one or more machine learning algorithms, one or more components of the plurality of components impacted by the issue with the at least one component are determined. In step 806, operational data for the at least one component and the one or more impacted components is collected. The determining and the collecting are performed as a real-time response to the receiving of the notification of the issue with the at least one component.

The determination of whether respective ones of the plurality of components are impacted by the issue with the at least one component is based on computed physical distances of the respective ones of the components from the at least one component, predicted failure dates of the respective ones of the components based at least in part on their manufacture dates, computed mean times between failure of the respective ones of the components and/or calculated heat resistance values of the respective ones of the components.

In an illustrative embodiment, the machine learning algorithm comprises a KNN algorithm, which analyzes physical distances of the respective ones of the components from the at least one component, failure dates of the respective ones of the plurality of components, mean times between failure of the respective ones of the plurality of components, and/or heat resistance values of the respective ones of the plurality of components to determine the impacted components and a hierarchy of the impacted components. The impact hierarchy arranges the one or more impacted components in a descending order of impact by the issue with the at least one component. The operational data is collected starting from the at least one component and from the one or more impacted components in an order corresponding to the impact hierarchy.

It is to be appreciated that the FIG. 8 process and other features and functionality described above can be adapted for use with other types of information systems configured to execute component data management services in a component management platform or other type of platform.

The particular processing operations and other system functionality described in conjunction with the flow diagram of FIG. 8 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a component management platform as disclosed herein can provide a number of significant advantages relative to conventional arrangements. For example, unlike conventional techniques, the embodiments advantageously use machine learning techniques to identify impacted components with respect to a component experiencing a failure event or issue. The embodiments trigger operational information or evidence collection in real-time for the identified components. The embodiments provide a trigger-based collection and uploading of evidence files for not only a component which is the subject of an alert, but also for impacted components at a time when the alert was generated. The embodiments, therefore, avoid discrepancies in the captured state information for the impacted components that previously occurred due to time lapse.

Under conventional techniques, logs from dependent components are not generated and collected at the time when an alert is generated from a particular component. Accordingly, under current approaches, complete device operational data for multiple components is collected a considerable time after data collection from the component which is subject of the alert is completed. As a result, there is large lapse of time between data collection from the alert component and the remaining components so that there may be several changes in the states of remaining components before their data is collected, leading to discrepancies and inaccuracies.

Unlike conventional techniques, the embodiments use machine learning techniques to collect alert-based logs and operational data for a component which has an issue and to further collect logs and operational data for other components impacted by the component with the issue. The embodiments provide an event-based triggering system to record the last functioning state of impacted devices at the time of an alert or failure, and to identify if there are any functional issues at later points in time following the alert or failure.

The machine learning algorithms advantageously provide a method to find the real-time dependence between components by analyzing runtime behavior of components and their different fluid characteristics like proximal distance, resistance to failure, resistance to heat, etc. The embodiments further generate evidence files by collecting data from all the required components based on an impact tree as discussed herein above, which is used to determine the sequence in which operational data should be collected when an alert corresponding to a device component is generated. Accordingly, when deciding the root cause of computing environment issues, engineers and other technical personnel can make informed and accurate decisions based on data when the failure occurred instead of data collected following a time lag after the failure, saving time and computing resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the component management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a component management platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
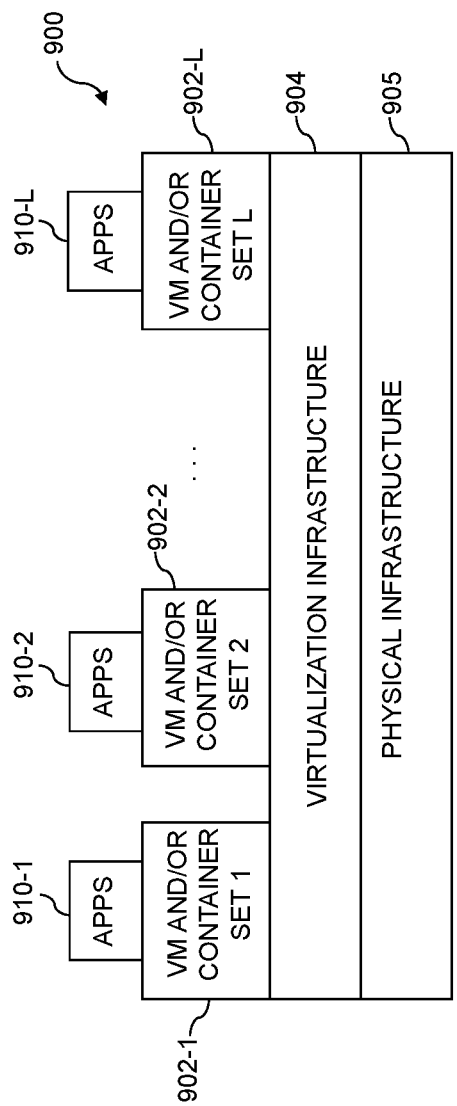
FIGS. 9 and 10 show examples of processing platforms that may be utilized to implement at least a portion of an information processing system according to illustrative embodiments.
Figure 10:
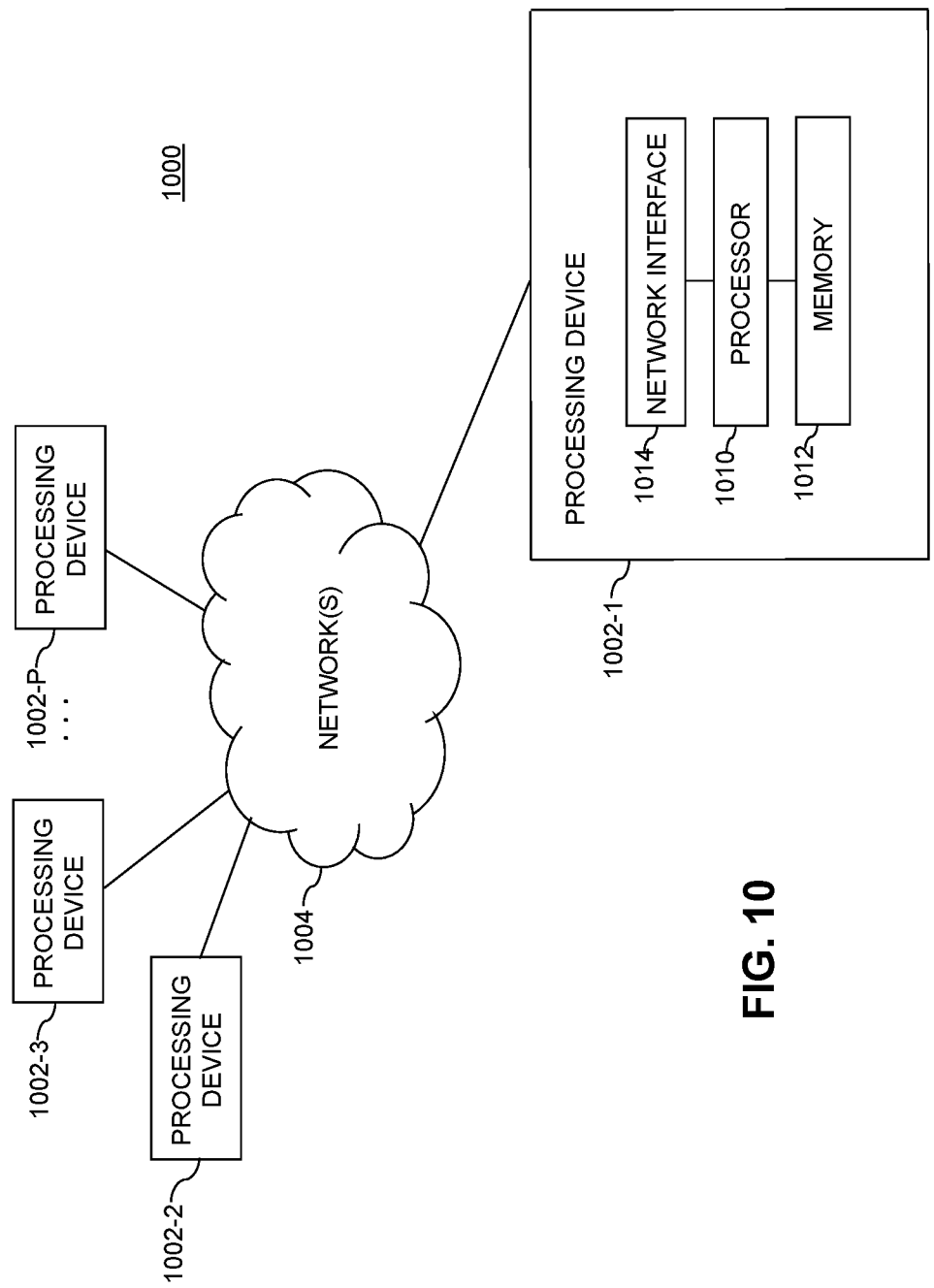

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-P, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the component management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and component management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to receive a notification of an issue with at least one component of a plurality of components in a computing environment;
   to determine, using one or more machine learning algorithms, one or more components of the plurality of components impacted by the issue with the at least one component, and an impact hierarchy of the one or more impacted components, wherein the impact hierarchy arranges the one or more impacted components in an order of impact by the issue with the at least one component;
   to collect operational data for the at least one component and the one or more impacted components, wherein the operational data is collected starting from the at least one component and from the one or more impacted components in the order corresponding to the impact hierarchy; and
   to train the one or more machine learning algorithms with data corresponding to operation of the plurality of components and how the plurality of components interact with each other.

2. The apparatus of claim 1 wherein said at least one processing platform is configured to perform the determining and the collecting as a real-time response to the receiving of the notification of the issue with the at least one component.

3. The apparatus of claim 1 wherein, in determining the one or more impacted components, said at least one processing platform is configured:
   to compute physical distances of respective ones of the plurality of components from the at least one component; and
   to determine whether the respective ones of the plurality of components are impacted by the issue with the at least one component based at least in part on their computed physical distances.

4. The apparatus of claim 1 wherein, in determining the one or more impacted components, said at least one processing platform is configured:
   to predict failure dates of respective ones of the plurality of components based at least in part on manufacture dates of the respective ones of the plurality of components; and
   to determine whether the respective ones of the plurality of components are impacted by the issue with the at least one component based at least in part on their predicted failure dates.

5. The apparatus of claim 1 wherein, in determining the one or more impacted components, said at least one processing platform is configured:
   to compute mean times between failure of respective ones of the plurality of components; and
   to determine whether the respective ones of the plurality of components are impacted by the issue with the at least one component based at least in part on their computed mean times between failure.

6. The apparatus of claim 1 wherein, in determining the one or more impacted components, said at least one processing platform is configured:
   to calculate heat resistance values of respective ones of the plurality of components; and
   to determine whether the respective ones of the plurality of components are impacted by the issue with the at least one component based at least in part on their calculated heat resistance values.

7. The apparatus of claim 1 wherein the one or more machine learning algorithms comprises a k-Nearest Neighbor (KNN) algorithm.

8. The apparatus of claim 7 wherein, in determining the one or more impacted components, said at least one processing platform is configured to analyze one or more parameters with the KNN algorithm, and wherein the one or more parameters comprise at least one of physical distances of respective ones of the plurality of components from the at least one component, failure dates of the respective ones of the plurality of components, mean times between failure of the respective ones of the plurality of components, and heat resistance values of the respective ones of the plurality of components.

9. The apparatus of claim 1 wherein the operational data comprises at least one of states of the at least one component and the one or more impacted components, and operational logs of the at least one component and the one or more impacted components.

10. The apparatus of claim 9 wherein said at least one processing platform is configured to collect the operational data for the at least one component and the one or more impacted components at a time of generation of the notification.

11. The apparatus of claim 1 wherein said at least one processing platform is further configured to upload the collected operational data to a cloud storage platform.

12. A method comprising:
    receiving a notification of an issue with at least one component of a plurality of components in a computing environment;
    determining, using one or more machine learning algorithms, one or more components of the plurality of components impacted by the issue with the at least one component, and an impact hierarchy of the one or more impacted components, wherein the impact hierarchy arranges the one or more impacted components in an order of impact by the issue with the at least one component;
    collecting operational data for the at least one component and the one or more impacted components, wherein the operational data is collected starting from the at least one component and from the one or more impacted components in the order corresponding to the impact hierarchy; and
    training the one or more machine learning algorithms with data corresponding to operation of the plurality of components and how the plurality of components interact with each other;
    wherein the method is performed by at least one processing platform comprising at least one processing device comprising a processor coupled to a memory.

13. The method of claim 12 wherein the determining and the collecting are performed as a real-time response to the receiving of the notification of the issue with the at least one component.

14. The method of claim 12 wherein the one or more machine learning algorithms comprises a k-Nearest Neighbor (KNN) algorithm.

15. The method of claim 14 wherein determining the one or more impacted components comprises analyzing one or more parameters with the KNN algorithm, and wherein the one or more parameters comprise at least one of physical distances of respective ones of the plurality of components from the at least one component, failure dates of the respective ones of the plurality of components, mean times between failure of the respective ones of the plurality of components, and heat resistance values of the respective ones of the plurality of components.

16. The method of claim 12 further comprising uploading the collected operational data to a cloud storage platform.

17. A computer program product comprising a non-transitory processor-readable storage medium having stored therein program code of one or more software programs, wherein the program code when executed by at least one processing platform causes said at least one processing platform:
   to receive a notification of an issue with at least one component of a plurality of components in a computing environment;
   to determine, using one or more machine learning algorithms, one or more components of the plurality of components impacted by the issue with the at least one component, and an impact hierarchy of the one or more impacted components, wherein the impact hierarchy arranges the one or more impacted components in an order of impact by the issue with the at least one component;
   to collect operational data for the at least one component and the one or more impacted components, wherein the operational data is collected starting from the at least one component and from the one or more impacted components in the order corresponding to the impact hierarchy; and
   to train the one or more machine learning algorithms with data corresponding to operation of the plurality of components and how the plurality of components interact with each other.

18. The computer program product according to claim 17 wherein the one or more machine learning algorithms comprises a k-Nearest Neighbor (KNN) algorithm.

19. The computer program product according to claim 18 wherein, in determining the one or more impacted components, the program code causes said at least one processing platform to analyze one or more parameters with the KNN algorithm, and wherein the one or more parameters comprise at least one of physical distances of respective ones of the plurality of components from the at least one component, failure dates of the respective ones of the plurality of components, mean times between failure of the respective ones of the plurality of components, and heat resistance values of the respective ones of the plurality of components.

20. The computer program product according to claim 17 wherein the program code further causes said at least one processing platform to upload the collected operational data to a cloud storage platform.

* * * * *